United States Patent Office 3,430,518
Patented Mar. 4, 1969

3,430,518
DIFFERENTIAL-ACTION CHANGE-SPEED
MECHANISMS
Jean Auriol, Billancourt, France, assignor to Regie
Nationale des Usines Renault, Billancourt, France
Filed May 12, 1967, Ser. No. 638,095
Claims priority, application France, May 31, 1966,
63,485
U.S. Cl. 74—705          4 Claims
Int. Cl. F16h 37/06

ABSTRACT OF THE DISCLOSURE

Change-speed mechanism of the type comprising a primary shaft provided with pinions rotatably driven from said shaft, and a secondary shaft provided with free pinions adapted to mesh with the pinions of said primary shaft and be locked with respect to said secondary shaft by means of coupling devices, said change-speed mechanism being characterised in that said secondary shaft is provided with a differential action device consisting of a planet-wheel carrier secured to said secondary shaft and of a pair of free sun gears adapted to be either locked against rotation by means of braking members, or locked to said free pinions of said secondary shaft by means of coupling devices.

The present invention relates to change-speed or gear-box mechanisms of the type comprising a primary shaft carrying pinions rotatably driven from this shaft, and a secondary or lay shaft provided with free pinions adapted to be brought into meshing engagement with the pinions of said primary shaft and locked in relation to said secondary shaft by means of coupling devices, this transmission mechanism being characterised essentially in that said secondary shaft comprises a differential-action device consisting of a planet carrier secured to said shaft and of a pair of loosely rotating sun gears adapted to be either held against rotation by braking means or rendered rotatably rigid with said free pinions of said secondary shaft by means of adequate coupling devices.

According to a specific form of embodiment of this invention the forward gear ratios are obtained by either rotatably locking one of said pinions of said secondary shaft with respect to the corresponding sun gear while holding the opposite sun gear against motion, or rotatably locking each free pinion of said secondary shaft to the corresponding sun gear, or alternately by engaging the reverse pinions and causing each one of the free pinions of said secondary shaft, of which one revolves when the reverse is engaged, to be locked or coupled for rotation with the corresponding sun gear, the gear ratios provided by these sun gears being calculated with a view to produce a differential action whereby a very slow resultant forward motion is obtained.

The reverse ratios are obtained by shifting one of the pinions of the primary shaft for meshing engagement with the set of reverse gears, by either directly locking the corresponding free pinion of the secondary shaft with respect to this shaft, or rotatably locking said free pinion in relation to the relevant sun gear while holding the opposite sun gear against motion.

Other features and advantages of this invention will appear as the following description proceeds with reference to the accompanying drawing illustrating diagrammatically by way of example a typical form of embodiment of a differential-action change-speed mechanism constructed according to the teachings of this invention.

Figure 1:
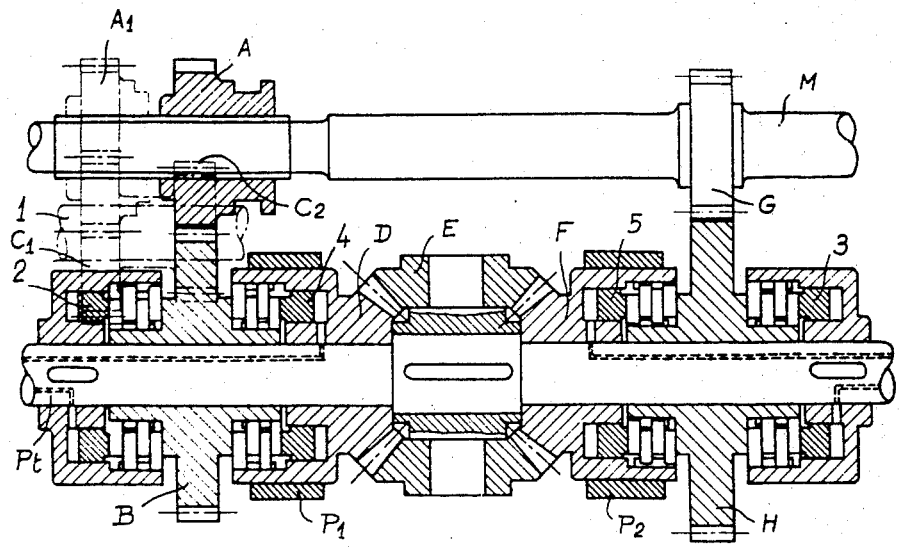
FIGURE 1 is a part-sectional, part-elevational view of this mechanism.
Figure 2:
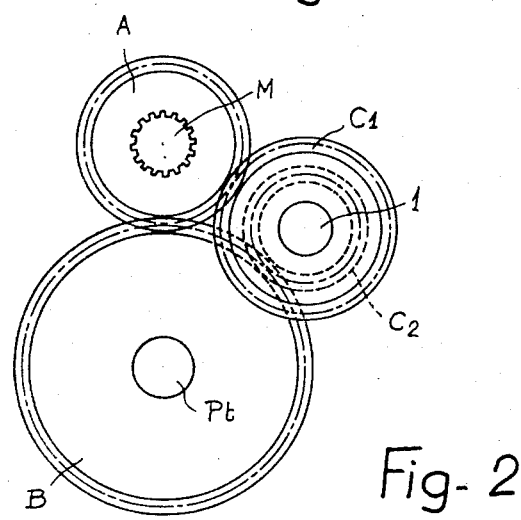
FIGURE 2 is a diagrammatic end view of the mechanism.

Referring to FIGURES 1 and 2 of the drawing it will be seen that the transmission mechanism according to this invention comprises a primary shaft M to which the engine torque is applied, an intermediate reverse-gear shaft or lay-shaft 1, and a secondary or lay shaft $Pt$ driving the wheels of a vehicle (not shown), such as a farming tractor, an earth-moving equipment, a utility vehicle, a passenger vehicle, etc. Respectively mounted on these three shafts are a fixed pinion G and a pinion A rotatably driven by shaft M but adapted to slide thereon to a position $A_1$, a pair of fixed pinions $C_1$ and $C_2$ rigidly coupled to each other, said pinion A driving pinion $C_1$ when the former is in said position $A_1$, a pair of free pinions B, H, pinion B meshing with pinions A and $C_2$, and a differential-action device comprising for example a fixed planet-wheel carrier E and a pair of opposite sun gears D and F mounted for loose rotation on shaft $Pt$. Pinions B and H are adapted to be locked separately with respect to shaft $Pt$ and to sun gears D, F, preferably by means of clutches 2 and 3, 4 and 5, the braking members $P_1$ and $P_2$, such as brake shoes, being adapted to lock against rotation the sun gears D and F. Said clutches 2, 3, 4, 5 and the braking members $P_1$ and $P_2$ are advantageously of the type actuatable by means of a fluid under pressure from a suitable source, for example a pump incorporated in the transmission mechanism and utilizing the oil from the engine sump, or from a distributor connected to a hydraulic control circuit.

The operation of the transmission mechanism of this invention will now be described, the same reference numeral designating a pinion and the number of teeth of this pinion. Moreover, it will be assumed that the value of ratio $G/H$ is smaller than that of ratio $A/B$.

Figure 3:
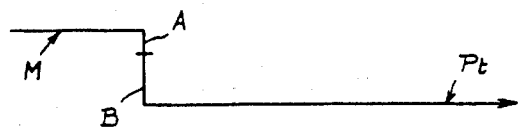
FIGURES 3 to 10 are explanatory diagrams in which only the torque-transmitting portions of the mechanism are shown in thick or dash lines.

In a first gear ratio having the value $A/B$ (see FIGURE 3), pinion A drives the toothed wheel rotating bodily with shaft $Pt$ by the engagement of clutch 2.

Figure 4:
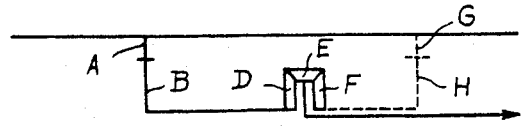

The second gear ratio of the transmission, having a value $\frac{1}{2}(A/B+G/H)$ (FIGURE 4), is obtained by engaging both clutches 4 and 5, whereby pinions B and H are rotatably locked in relation to the sun gears D and F of the differential device.

Figure 5:
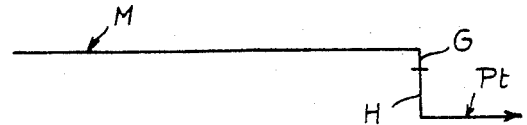

In a third gear ratio having the value $G/H$— (FIGURE 5) the clutch 3 permits of locking the pinion H with respect to the secondary shaft $Pt$.

Figure 6:
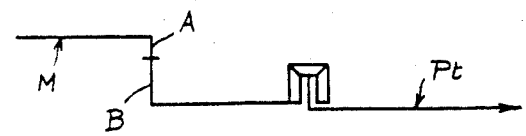
Figure 7:
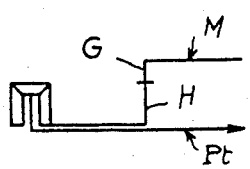

Alternately, the sun gears D or F may be held against motion by applying the brake shoes $P_1$ or $P_2$, the values of these fourth (FIGURE 6) and fifth (FIGURE 7) gear ratios corresponding respectively to $\frac{1}{2}$ A/B and $\frac{1}{2}$ G/H.

Figure 8:
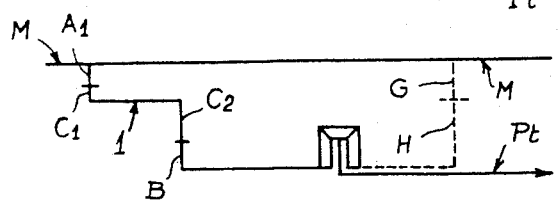

To obtain a sixth, so-called "crawling" gear ratio, which provides a very considerable gear reduction (FIGURE 8), the clutches 4 and 5 are engaged and thus pinion A moved to position $A_1$ permits of driving the reverse gears gears $C_1$ and $C_2$, pinion B and sun gear D, and pinion G causes the gear wheel H and sun gear F in the forward-drive direction. As a result, the sixth gear ratio has a value $\frac{1}{2}(G/H - A/C_1 \times C_2/B)$ as small as desired.

The above-described change-speed transmission also provides two reverse gears, when pinion A is in position $A_1$.

Figure 9:
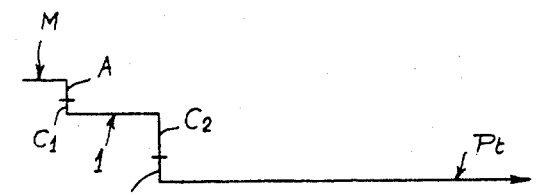

In fact, a first reverse gear ratio (FIGURE 9) having a value $-A/C_1 \times C_2/B$, is obtained by locking the pinion B with respect to the secondary shaft $Pt$ by means of clutch 2.

Figure 10:
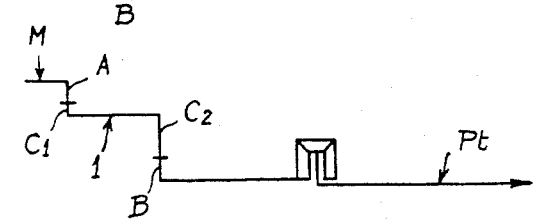

This pinion B may also be locked with respect to the sun gear D by means of clutch 4, the sun gear F being held against motion by actuating the braking device $P_2$. This second reverse gear (FIGURE 10) has half the value of the first one: $-\frac{1}{2} A/C_1 \times C_2/B$.

Furthermore, with this mechanism it is possible to shift instantaneously from forward drive conditions to reverse drive conditions and vice versa, and to cause the vehicle driven through the secondary shaft $Pt$ to perform a reciprocating motion.

According to a first possibility, as the pinions H and B are locked to the secondary shaft $Pt$ by means of clutches 3 and 2, it is actually possible to drive the vehicle indifferently forwards or backwards, pinion A being in position $A_1$. In fact, the input shaft M will drive the secondary shaft $Pt$ via pinions G, H in the first case and via pinions A (in position $A_1$), $C_1$, $C_2$, and B in the second case.

In the second case it is possible to engage alternately either clutch 5 and braking device $P_1$, or clutch 4 and braking device $P_2$. In the first instance, corresponding to the forward drive of the vehicle, pinion G drives pinion H rigid with sun gear F, the other sun gear D being held against rotation. In the second case, pinion A, in position $A_1$, permits the rotation of gear wheel B rigid with sun gear D through the medium of the reverse pinions $C_1$ and $C_2$, sun gear F being held against rotation.

In the above-described form of embodiment, the provision of a clutch between the input shaft M and the engine output shaft (not shown) is not necessary, and it is possible to shift instantaneously, during the operation of the vehicle, from one gear ratio to another, as far as the five upper gear ratios are concerned.

It is also possible to shift instantaneously from reverse to forward drive and vice versa, and this particular feature makes this transmission mechanism particularly advantageous for use in tractors and earth-moving or public works equipments, for works requiring a reciprocating motion.

Moreover, this change-speed mechanism, intended mainly for farming tractors, is suitable for use in other automotive vehicles, such as passenger vehicles, utilitary vans and the like, public works equipments, etc., and as a rule in all mechanical machines requiring the use of multiple gear ratios in transmission systems.

For certain uses, and notably in the case of a farming tractor, the number of gear reduction ratios may be multiplied by associating a conventional reducing gear providing two or more ratios.

However, the invention is by no means limited to the particular form of embodiment of the components thereof, and/or to the particular uses and applications, that have been explicitly mentioned; therefore, various modifications and variations lying within the scope of the invention may be brought by those conversant with the art without departing from the spirit and scope of the invention as set forth in the appended claims.

I claim:
1. Change-speed mechanism of the type comprising a primary shaft provided with pinions rotatably driven from said shaft, and a secondary shaft provided with free pinions adapted to mesh with the pinions of said primary shaft and be locked with respect to said secondary shaft by means of coupling devices, said change-speed mechanism being characterized in that said secondary shaft is provided with a differential action device consisting of a planet-wheel carrier secured to said secondary shaft and of a pair of free sun gears adapted to be either locked against rotation by means of braking members, or locked to said free pinions of said secondary shaft by means of coupling devices.

2. Change-speed mechanism according to claim 1, including reverse drive pinions operatively connectable between one of said primary shaft pinions and its respective free pinion, characterized in that the forward-drive gear ratios are obtained either by causing any one of said free pinions to rotate bodily with said secondary shaft, or locking one of said pinions of said secondary shaft with respect to the corresponding sun gear while holding the opposite sun gear against motion, or alternately by causing each free pinion of said secondary shaft to rotate bodily with the corresponding sun gear, or by engaging said reverse-drive pinions and locking each one of said free pinions of said secondary shaft, one of said free pinions revolving in reverse, with respect to the corresponding sun gear, the ratios of these sun gears being calculated with a view to produce a differential action providing an extremely slow resultant forward drive motion.

3. Change-speed mechanism according to claim 1, including reverse drive pinions operatively connectable between one of said primary shaft pinions and its respective free pinion, characterized in that the reverse-drive gear ratios are obtained by shifting one of the pinions of said primary shaft for causing said one pinion to engage said reverse pinions, by either directly locking the corresponding free pinion of said secondary shaft with respect to said secondary shaft, or locking the same pinion with respect to the corresponding sun gear while holding the opposite sun gear against motion.

4. Change-speed mechanism according to claim 1, characterized in that the devices for causing the engagement of said pinions and the braking members are fluid actuated permitting the instantaneous shifting under load from one forward gear ratio to another, and from one reverse gear ratio to a forward drive gear ratio, and vice versa.

References Cited
UNITED STATES PATENTS

| | | | |
|---|---|---|---|
| 1,333,729 | 3/1920 | Pollard | 74—757 |
| 2,092,698 | 9/1937 | Hamblin | 74—780 X |
| 2,585,217 | 2/1952 | Bickel et al. | 74—674 X |
| 2,682,785 | 7/1954 | Cerutti et al. | 74—674 |
| 2,692,514 | 10/1954 | O'Leary | 74—674 X |
| 3,336,819 | 8/1967 | Jones | 74—674 |

FOREIGN PATENTS 935,298  2/1948  France.

DONLEY J. STOCKING, *Primary Examiner.*

THOMAS C. PERRY, *Assistant Examiner.*

U.S. Cl. X.R.

74—756, 757